United States Patent
Bowman et al.

(10) Patent No.: US 10,504,057 B2
(45) Date of Patent: Dec. 10, 2019

(54) EXECUTING MULTI-ECHELON ONLINE AND STORE RETAIL NETWORK STOCKING PLAN BASED ON STOCK-OUT COSTS

(71) Applicant: WAL-MART STORES, INC., Bentonville, AR (US)

(72) Inventors: John Bowman, El Cerrito, CA (US); Jagtej Bewli, San Francisco, CA (US); Bradley Weill, Mountain View, CA (US); Yamini Kangude, Foster City, CA (US); Sony Gregory, Foster City, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 163 days.

(21) Appl. No.: 15/420,769

(22) Filed: Jan. 31, 2017

(65) Prior Publication Data

US 2018/0218314 A1    Aug. 2, 2018

(51) Int. Cl.
*G06Q 10/08*    (2012.01)
*G06Q 30/02*    (2012.01)

(52) U.S. Cl.
CPC ....... *G06Q 10/087* (2013.01); *G06Q 30/0202* (2013.01)

(58) Field of Classification Search
CPC .... G06Q 10/087; G06Q 20/203; G06Q 10/08; G06Q 30/02
See application file for complete search history.

(56) References Cited

U.S. PATENT DOCUMENTS 5,953,707 A * 9/1999 Huang ............... G06Q 10/06
                                                   705/7.25
5,963,919 A * 10/1999 Brinkley ............. G06Q 10/087
                                                     705/22

(Continued)

OTHER PUBLICATIONS

Bendoly, Elliot, Integrated inventory pooling for firms servicing both on-line and store demand Computers & Operations Research, vol. 31, 2004, pp. 1465-1480 (Year: 2004).*

(Continued)

*Primary Examiner* — Scott L Jarrett
(74) *Attorney, Agent, or Firm* — Bryan Cave Leighton Paisner LLP

(57) ABSTRACT

In many embodiments, a method can comprise receiving an online order for an item from a user and receiving an estimate of a network stockout cost of a network associated with the item, the network comprising at least a first fulfillment center and a second fulfillment center. In some embodiments, the method further can comprise updating a first local stockout cost and updating a second local stockout. In various embodiments, the method further can comprise executing a first stocking plan for the item at the first fulfillment center based at least in part on the updated first local stockout cost, executing a second stocking plan for the item at the second fulfillment center based at least in part on the updated second local stockout cost, and selecting the first fulfillment center to deliver the item pursuant to the online order from the user based at least in part on the first stocking plan. Other embodiments of related methods and systems are also provided.

20 Claims, 5 Drawing Sheets

(56) References Cited

U.S. PATENT DOCUMENTS

| | | | | |
|---|---|---|---|---|
| 6,341,269 | B1* | 1/2002 | Dulaney | G06Q 10/087 705/22 |
| 7,295,990 | B1 | 11/2007 | Braumoeller et al. | |
| 7,313,532 | B2* | 12/2007 | Mariamova | G06Q 10/04 705/7.25 |
| 7,877,301 | B2* | 1/2011 | Kernodle | G06Q 10/06375 705/28 |
| 8,032,406 | B2* | 10/2011 | Ouimet | G06Q 10/04 705/7.35 |
| 8,620,707 | B1 | 12/2013 | Belyi et al. | |
| 8,732,039 | B1* | 5/2014 | Chen | G06Q 10/063 705/26.1 |
| 2001/0047293 | A1* | 11/2001 | Waller | G06Q 10/087 705/22 |
| 2002/0035537 | A1* | 3/2002 | Waller | G06Q 10/087 705/37 |
| 2002/0138358 | A1* | 9/2002 | Scheer | G06Q 10/063 705/7.36 |
| 2003/0101107 | A1* | 5/2003 | Agarwal | G06Q 10/087 705/28 |
| 2004/0039664 | A1* | 2/2004 | Natan | G06Q 10/087 705/28 |
| 2006/0235557 | A1* | 10/2006 | Knight | G06Q 10/087 700/103 |
| 2009/0187468 | A1* | 7/2009 | Krech | G06Q 10/087 705/28 |
| 2012/0054076 | A1* | 3/2012 | Wu | G06Q 10/087 705/28 |
| 2014/0200946 | A1* | 7/2014 | Humphries | G06Q 10/06315 705/7.25 |
| 2015/0254589 | A1* | 9/2015 | Saxena | G06Q 10/06315 705/7.25 |

OTHER PUBLICATIONS

Artley, Melissa, Oracle Retail Advanced Inventory Planning—Store and Warehouse Replenishment User Guide for the RPAS Fusion Client, Oracle, Dec. 2014 (Year: 2014).*

Howard, Christian, Real-time Allocation Decisions in Multi-echelon Inventory Control Lund University, Jan. 1, 2013 (Year: 2013).*

Volker, Trauzettel, Optimal Stocking of Retail Outlets: The Case of Weekly Demand Pattern Business Logistics in Modern Management, 14th International Scientific Conference, 2014 (Year: 2014).*

Corbett, Charles J., Stochastic Inventory Systems in a Supply Chain With Asymmetric Information: Cycle Stocks, Safety Stocks, and Consignment Stock, Operations Research, vol. 49, No. 4, Jul./Aug. 2001 (Year: 2001).*

Mahar, Stephen et al., The value of postponing online fulfillment decisions in multi-channel retail/e-tail organizations Computers & Operations Research, vol. 36, 2009, pp. 3061-3072 (Year: 2009).*

Snyder, Larry, Multi-Echelon Inventory Optimization: An Overview Lehigh University, Nov. 13, 2008 (Year: 2008).*

Feng, Y., Xiao, B., "A New Algorithm for Computing Optimal (s,S) Policies in a Stochastic Single Item / Location Inventory System," IIE Transactions (2000) 32, 1081-1090. Jan. 1, 2000.

* cited by examiner

EXECUTING MULTI-ECHELON ONLINE AND STORE RETAIL NETWORK STOCKING PLAN BASED ON STOCK-OUT COSTS

TECHNICAL FIELD

This disclosure relates generally to systems for inventory replenishment and allocation, and related methods.

BACKGROUND

Many times, when a user of a website, such as an eCommerce website, views an item, availability and delivery date can affect a likelihood of the user ordering the item. System bandwidth can become slow or bottlenecked when calculating estimated delivery dates, times, and/or costs, while also updating a stocking plan for the item. The ability to efficiently update stocking plan for inventory and/or allocation of one or more items can decrease the demand on system resources and improve user experience. Accordingly, there is a need for systems and methods to provide for inventory replenishment and allocation.

BRIEF DESCRIPTION OF THE DRAWINGS

To facilitate further description of the embodiments, the following drawings are provided in which.

Figure 1:
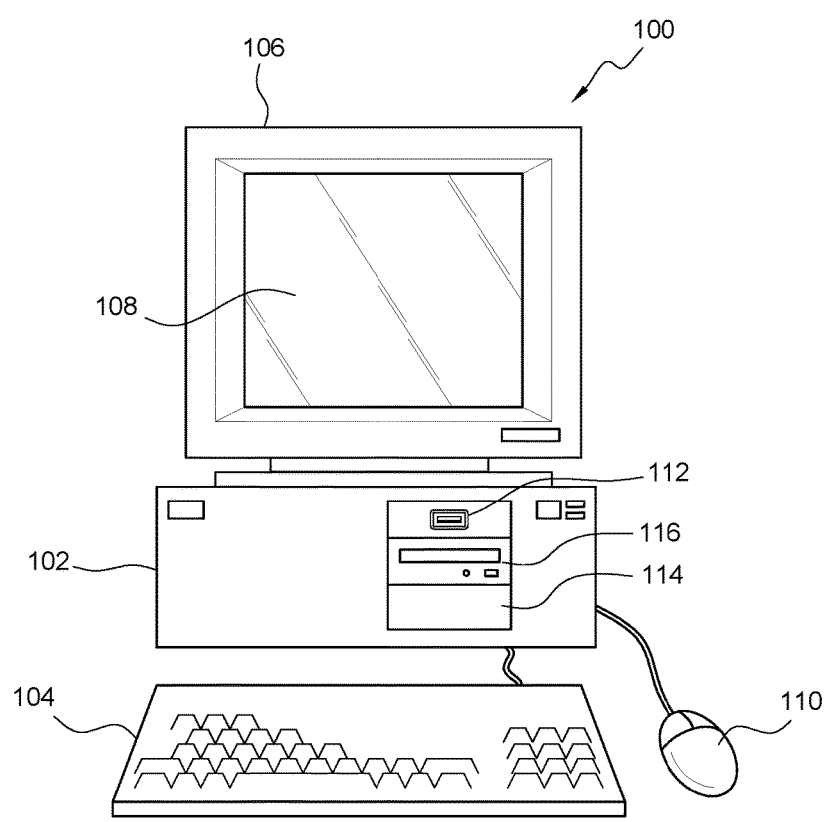
FIG. 1 illustrates a front elevation view of a computer system that is suitable for implementing at least part of a central computer system.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments can include a system. In many embodiments, the system can comprise one or more processing modules and one or more non-transitory storage modules storing computing instructions configured to run on the one or more processing modules and perform acts. In many embodiments, the acts can comprise receiving an online order for an item from a user, receiving an estimate of a network stockout cost of a network associated with the item, the network comprising at least a first fulfillment center and a second fulfillment center, determining a first local stockout cost of the first fulfillment center for the item by allocating a first portion of the network stockout cost to the first fulfillment center, and determining a second local stockout cost of the second fulfillment center for the item by allocating a second portion of the network stockout cost to the second fulfillment center. In some embodiments, the acts further can comprise updating the first local stockout cost by a first formula:

$$b_1^* = EFR_2 * b_1 + (1 - EFR_2) * b_N;$$

wherein $b_1^*$ is an updated first local stockout cost, $EFR_2$ is a second expected fill rate of the second fulfillment center, $b_1$ is the first local stockout cost, and $b_N$ is the network stockout cost. In many embodiments, the acts further can comprise updating the second local stockout cost by a second formula:

$$b_2^* = EFR_1 * b_2 + (1 - EFR_1) * b_N;$$

wherein: $b_2^*$ is an updated second local stockout cost, $EFR_1$ is a first expected fill rate of the first fulfillment center, and $b_2$ is the second local stockout cost. In many embodiments, the acts further can comprise executing a first stocking plan for the item at the first fulfillment center based at least in part on the updated first local stockout cost, executing a second stocking plan for the item at the second fulfillment center based at least in part on the updated second local stockout cost, and selecting the first fulfillment center to deliver the item pursuant to the online order from the user based at least in part on the first stocking policy.

In some embodiments, a method can comprise receiving an online order for an item from a user, receiving an estimate of a network stockout cost of a network associated with the item, the network comprising at least a first fulfillment center and a second fulfillment center, determining a first local stockout cost of the first fulfillment center for the item by allocating a first portion of the network stockout cost to the first fulfillment center, and determining a second local stockout cost of the second fulfillment center for the item by allocating a second portion of the network stockout cost to the second fulfillment center. In some embodiments, the method further can comprise updating the first local stockout cost by a first formula:

$$b_1^* = EFR_2 * b_1 + (1 - EFR_2) * b_N;$$

wherein $b_1^*$ is an updated first local stockout cost, $EFR_2$ is a second expected fill rate of the second fulfillment center, $b_1$ is the first local stockout cost, and $b_N$ is the network stockout cost. In many embodiments, the method further can comprise updating the second local stockout cost by a second formula:

$$b_2^* = EFR_1 * b_2 + (1 - EFR_1) * b_N;$$

wherein $b_2^*$ is an updated second local stockout cost, $EFR_1$ is a first expected fill rate of the first fulfillment center, and $b_2$ is the second local stockout cost. In many embodiments, the method further can comprise executing a first stocking plan for the item at the first fulfillment center based at least in part on the updated first local stockout cost, executing a second stocking plan for the item at the second fulfillment center based at least in part on the updated second local stockout cost, and selecting the first fulfillment center to deliver the item pursuant to the online order from the user based at least in part on the first stocking policy.

Various embodiments can include a method. In many embodiments, the method can comprise determining a network stockout cost of an item in a network, the network comprising at least a first fulfillment center and a second fulfillment center, allocating a first portion of the network stockout cost of the item to the first fulfillment center of the network, and allocating a second portion of the network stockout cost of the item to the second fulfillment center of the network. In many embodiments, the method further can comprise updating the first portion of the network stockout cost by a first formula:

$$b_1^* = EFR_2 * b_1 + (1 - EFR_2) * b_N;$$

wherein $b_1^*$ is an updated first portion of the network stockout cost, $EFR_2$ is a second expected fill rate of the second fulfillment center, $b_1$ is the first portion of the network stockout cost, and $b_N$ is the network stockout cost.

In a number of embodiments, the method further can comprise updating the second portion of the network stockout cost by a second formula $$b_2^* = EFR_1 * b_2 + (1 - EFR_1) * b_N;$$

wherein $b_2^*$ is an updated second portion of the network stockout cost, $EFR_1$ is a first expected fill rate of the first fulfillment center, and $b_2$ is the second portion of the network stockout cost. In many embodiments, the method further can comprise executing a first stocking plan for the item at the first fulfillment center based at least in part on the updated first portion of the network stockout cost, executing a second stocking plan for the item at the second fulfillment center based at least in part on the updated second portion of the network stockout cost, and selecting the first fulfillment center to deliver the item pursuant to an online order from a user based at least in part on the first stocking plan.

Figure 2:
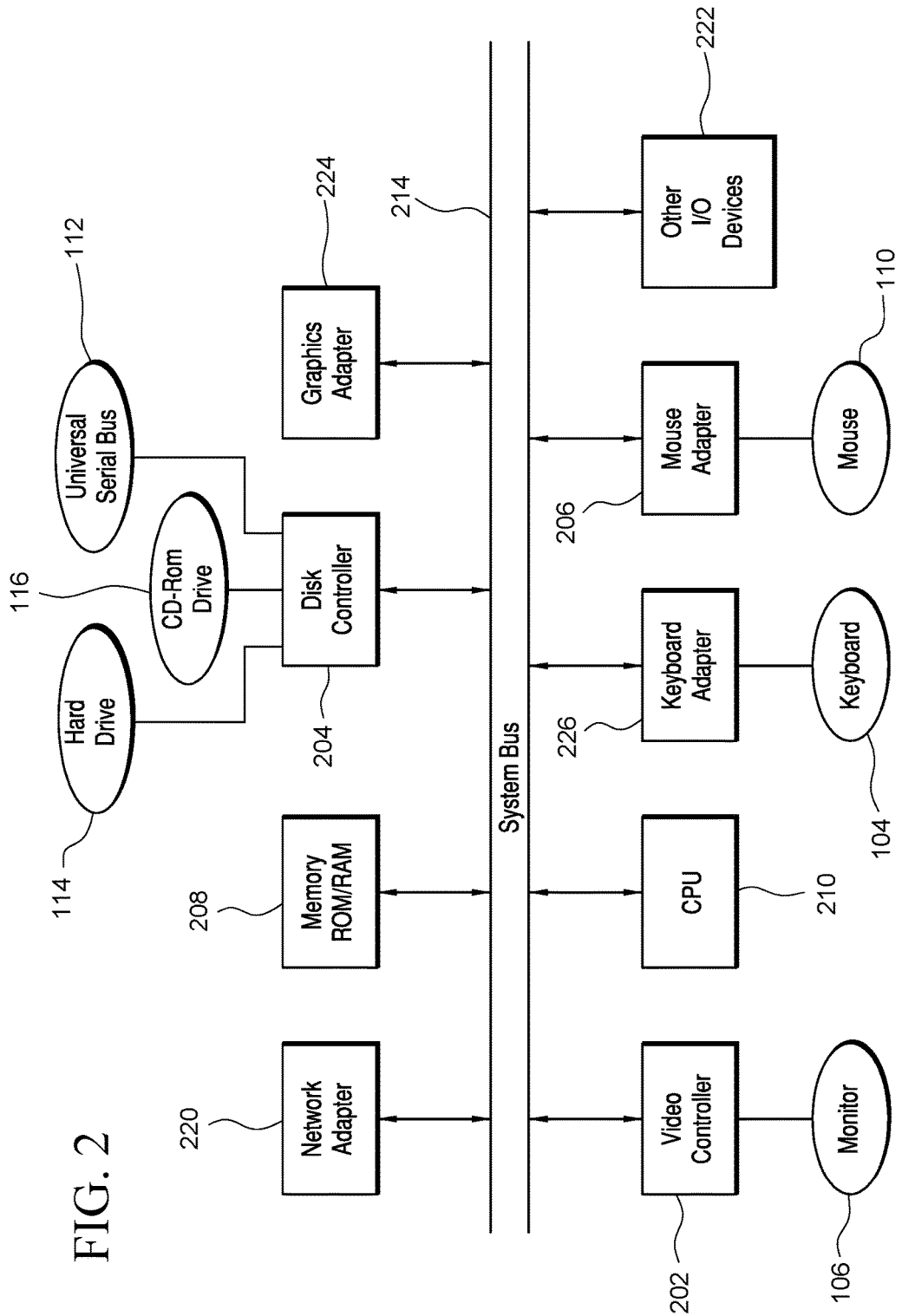
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile (e.g., non-transitory) memory, such as, for example, read only memory (ROM) and/or (ii) volatile (e.g., transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with a CD-ROM and/or DVD drive 116 (FIGS. 1-2), floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
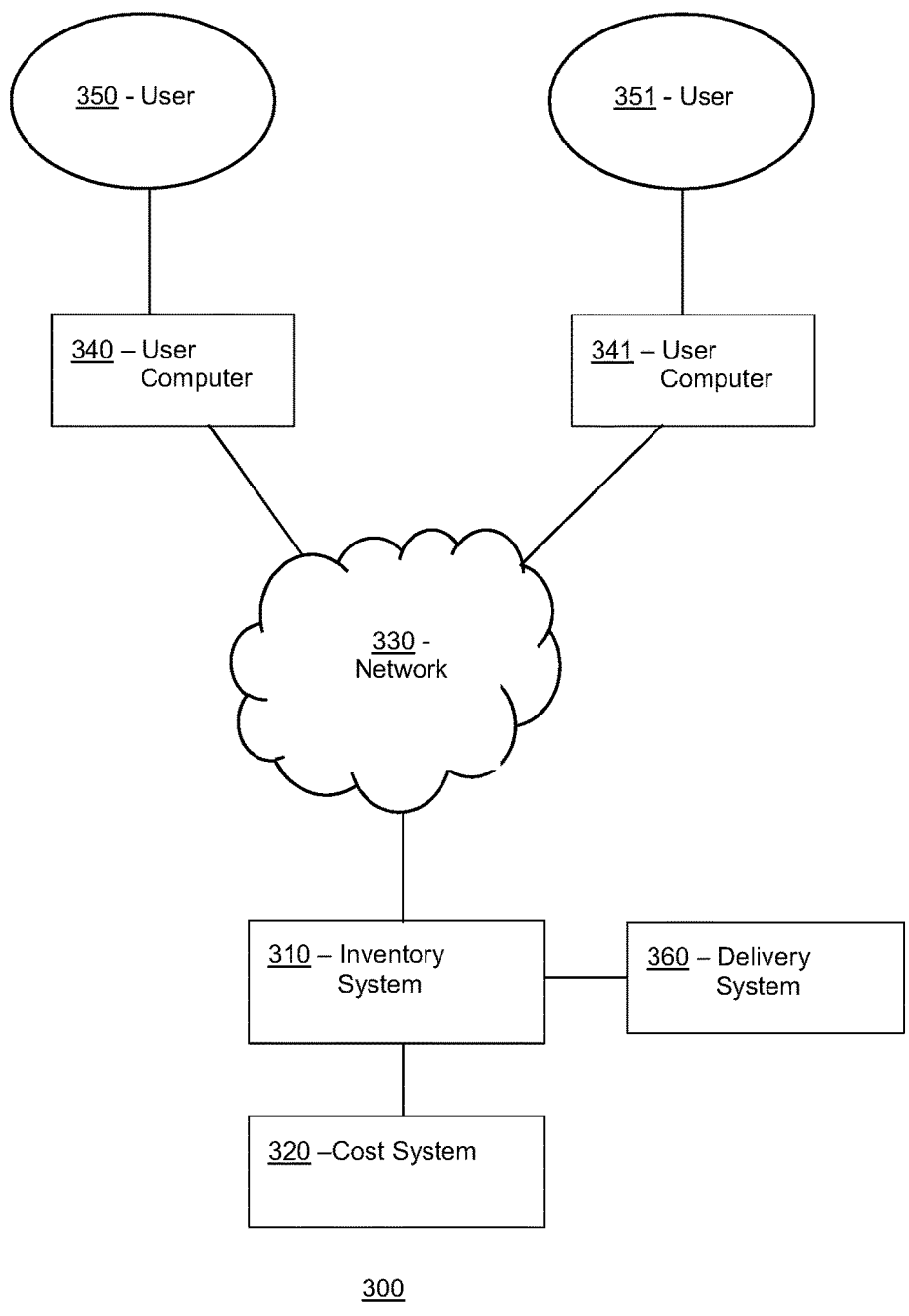
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In a number of embodiments, system 300 can comprise an, a cost system 320, and a delivery system 360. In some embodiments, inventory system 310, cost system 320, and delivery system 360 can each be a computer system 100 (FIG. 1), as described above, and can each be a single computer, a single server, or a cluster or collection of computers or servers. In some embodiments, inventory system 310 can be in communication with an inventory database (not shown) which can track distinct items (e.g., stock keeping units (SKUs)), and images of the distinct items, in a product catalog, which can be ordered through the online retailer and which can be housed at one or more warehouses and/or fulfillment centers. In many embodiments, warehouses and/or fulfillment centers can comprise brick-and-mortar stores, distribution centers, and/or other storage facilities.

In many embodiments, inventory system 310, cost system 320, and/or delivery system 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of inventory system 310, cost system 320, and/or delivery system 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of inventory system 310, cost system 320, and/or delivery system 360. In a similar manner, the processing module(s) and the memory storage module(s) can be local and/or remote to each other.

In many embodiments, inventory system 310 and/or delivery system 360 can be configured to communicate with one or more user computers 340 and 341. In some embodiments, user computers 340 and 341 also can be referred to as customer computers. In some embodiments, inventory system 310 and/or delivery system 360 can communicate or interface (e.g. interact) with one or more customer computers (such as user computers 340 and 341) through a network 330. In some embodiments, network 330 can be an internet, an intranet that is not open to the public, an email system, and/or a texting system. In many embodiments, network 330 can comprise one or more electronic transmission channels. In many embodiments, the electronic transmission channels can comprise an email, a text message, and/or an electronic notice or message. Accordingly, in many embodiments, inventory system 310 and/or delivery system 360 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, inventory system 310, cost system 320, and/or delivery system 360 also can be configured to communicate with one or more databases. The one or more database can comprise a product database that contains information about products, items, or SKUs sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between inventory system 310, cost system 320, delivery system 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

Figure 4:
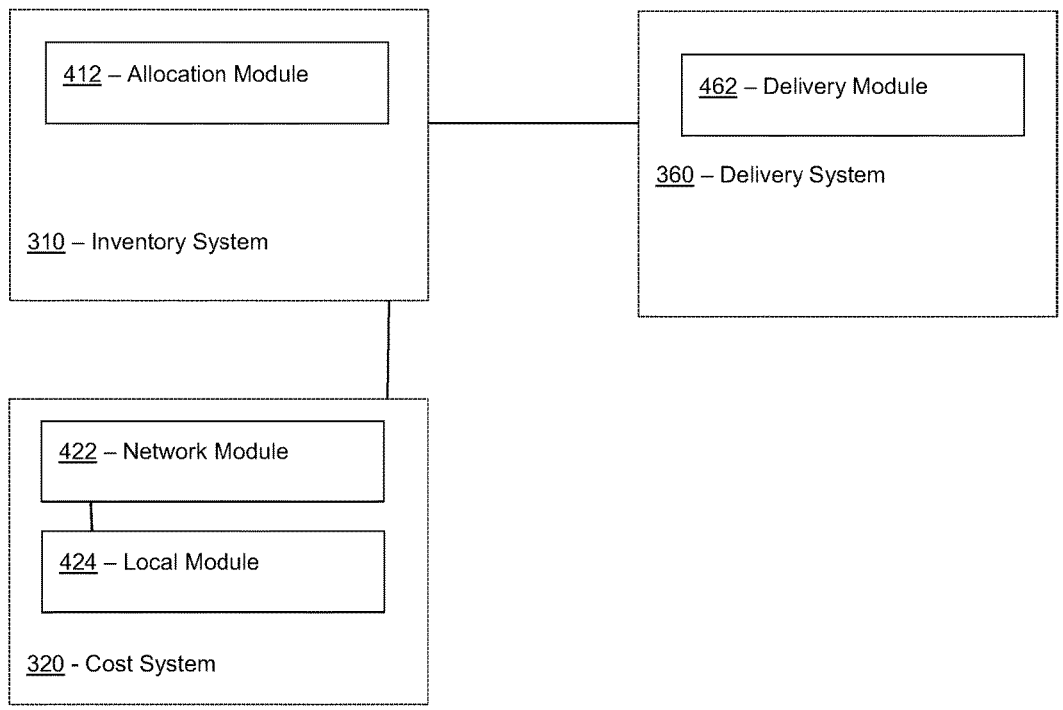
FIG. 4 illustrates a representative block diagram of a portion of the system of FIG. 3, according to an embodiment.
Figure 5:
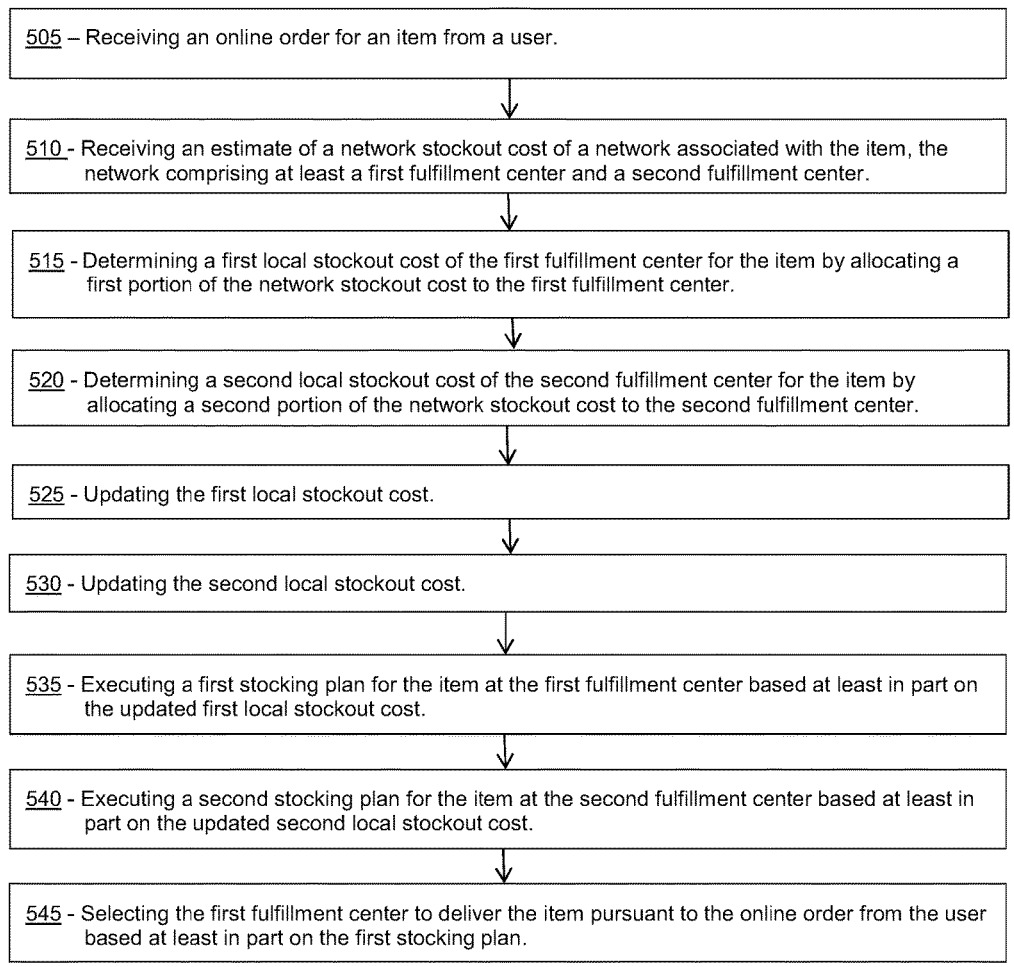
FIG. 5 illustrates is a flowchart for a method, according to an embodiment.

Turning ahead in the drawings, FIG. 5 illustrates a flow chart for a method 500, according to an embodiment. Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In many embodiments, system 300 (FIG. 3) can be suitable to perform method 500 and/or one or more of the activities of method 500. In these or other embodiments, one or more of the activities of method 500 can be implemented as one or more computer instructions configured to run at one or more processing modules and configured to be stored at one or more non-transitory memory storage modules 412, 422, 424, and/or 462 (FIG. 4). Such non-transitory memory storage modules can be part of a computer system such as inventory system 310 (FIGS. 3 & 4), cost system 320 (FIGS. 3 & 4), and/or delivery system 360 (FIGS. 3 & 4). The processing module(s) can be similar or identical to the processing module(s) described above with respect to computer system 100 (FIG. 1).

In many embodiments, method 500 comprises activities to minimize a sum of holding costs (described below), stockout costs (described below), and ordering costs. In some embodiments ordering costs can comprise a product of an expected number of orders for an item times a per-order cost for the item. In some embodiments, ordering cost can comprise order management costs and/or order receipt costs. Some advantages of aspects of method 500 include allowing for efficiently increasing detailed modeling of inventory without increasing demand on network bandwidth, increasing the ability to capture relationships between holding costs, stockout costs, and/or ordering costs, and/or providing an improved estimate of system (e.g., system 300) performance.

In many embodiments, method 500 can comprise an activity 505 of receiving an online order for an item from a user. In some embodiments, activity 505 further can comprise receiving a search query from the user, the search query returning a search result. In many embodiments, the search result can comprise the item. In various embodiments, activity 505 further can comprise receiving a selection of the item by the user, and receiving a notification that the user has added the item a checkout cart. In a number of embodiments, the item can comprise a holding cost (h). In various embodiments, the holding cost can comprise a first item holding cost associated with stocking the item at a first fulfillment center in a network and a second item holding cost associated with stocking the item at the second fulfillment center in the network. In some embodiments, the holding cost can be a product of a number of units of the item that are expected to be on hand at the fulfillment center times a per unit holding cost factor. In many embodiments, the holding cost is assumed to be linear.

In many embodiments, method 500 further can comprise an activity 510 of receiving an estimate of a network stockout cost of a network associated with the item, the network comprising at least a first fulfillment center and a second fulfillment center. The network stockout cost is a product of an expected number of stockouts (e.g., no units of the item at a fulfillment center) within the network multiplied by a per-stockout stockout cost. In many embodiments, the network stockout cost is assumed to be linear. In some embodiments, the first fulfillment center and the second fulfillment center can be indexed as 1,2. In some embodiments, method 500 can comprise receiving an estimated mean demand of the fulfillment centers in the network $m_i$, $i \in \{1,2\}$. In many embodiments, method 500 can comprise receiving an estimated standard deviation of demand $s_i$, $i \in \{1,2\}$. In some embodiments, the estimated mean demand and the estimated standard deviation can be over a leadtime. In some embodiments, the leadtime comprises approximately 1 week to 10 weeks. In many embodiments, method 500 further can comprise receiving an estimated network stockout cost $b_N$, which can be the cost of the item being out of stock simultaneously at both sites in the network. In some embodiments, the estimated network stockout cost can comprise an estimate of one or more lost sales due to the cost of the item being out of stock simultaneously at both sites in the network. In many embodiments, each fulfillment center in the network can have a site-specific local stockout cost $b_i$, $i \in \{1,2\}$, which can capture an average extra cost involved in supplying a user from an "other" site (e.g., supplying or delivering the item from the first fulfillment center instead of the second fulfillment center).

In some embodiments, method 500 further can comprise an activity 515 of determining a first local stockout cost of the first fulfillment center for the item by allocating a first portion of the network stockout cost to the first fulfillment center. In some embodiments, the first local stockout cost can be based at least in part on the first holding cost. In many embodiments, a local stockout cost (e.g., the first local stockout cost) can depend on the user being supplied and/or delivered by a particular fulfillment center (e.g., the first fulfillment center) which can ship the item to the user with a least expense. In some embodiments, shipping to a user in a geographic area (described below) from an other site (e.g., the second fulfillment center) can incurs an extra expense, and therefor an average extra expense incurred across all demands in the geographic area comprises the local stockout cost. In some embodiments, activity 515 can comprise allocating a first portion of the network stockout cost of the item to the first fulfillment center of the network.

In various embodiments, method 500 further can comprise an activity 520 of determining a second local stockout cost of the second fulfillment center for the item by allocating a second portion of the network stockout cost to the second fulfillment center. In some embodiments, the second local stockout cost can be based at least in part on the second holding cost. In some embodiments, activity 520 can comprise allocating a second portion of the network stockout cost of the item to the second fulfillment center of the network.

In some embodiments, method 500 further can comprise an activity 525 of updating the first local stockout cost. In some embodiments, activity 525 can comprise updating the first local cost according to the formula in equation 1:

$$b_1^* = EFR_2 * b_1 + (1 - EFR_2) * b_N; \quad \text{(Equation 1)}$$

where $b_1^*$ is an updated first local stockout cost, $EFR_2$ is a second expected fill rate of the second fulfillment center, $b_1$ is the first local stockout cost, and $b_N$ is the network stockout cost. In many embodiments, an expected fill rate (e.g., second expected fill rate) can comprise an expected fraction of demand that a stocking plan (described below) can fill.

In some embodiments, method 500 further can comprise an activity 530 of updating the second local stockout cost. In many embodiments, activity 530 can comprise updating the second local stockout cost the formula in equation 2:

$$b_2^* = EFR_1 * b_2 + (1 - EFR_1) * b_N; \quad \text{(Equation 2)}$$

where $b_2^*$ is an updated second local stockout cost, $EFR_1$ is a first expected fill rate of the first fulfillment center, and $b_2$ is the second local stockout cost.

In some embodiments, the sequence of activities 515 and 520 can be reversed and/or performed simultaneously with each other, and the sequence of activities 525 and 530 can be reversed and/or performed simultaneously with each other. In other embodiments, activities 515 and 525 can be performed before activities 520 and 530.

In many embodiments, method 500 further can comprise an activity 535 of executing a first stocking plan for the item at the first fulfillment center based at least in part on the updated first local stockout cost. In many embodiments, a stocking plan (e.g., the first stocking plan) can be referred to as a stocking policy. A stocking plan (e.g., the first stocking plan) can comprise a proposed ordering number and/or stocking level for each fulfillment center in the network. In many embodiments, the stocking plan (e.g., the first stocking plan) can comprise a recommended number of units of the item to order and/or maximum number of units of the item to order for each fulfillment center in the network. In some embodiments, the stocking plan can be expressed as integers (e.g., (19, 25), where 19 is the recommended number of units of the item to order and 25 is the maximum number of units of the item to order for the first fulfillment center).

In a number of embodiments, method 500 further can comprise an activity 540 of executing a second stocking plan for the item at the second fulfillment center based at least in part on the updated second local stockout cost. The sequence of activities 535 and 540 can be reversed or performed simultaneously with each other.

In many embodiments, method 500 further can comprise an activity 545 of selecting the first fulfillment center to deliver the item pursuant to the online order from the user based at least in part on the first stocking plan. In some embodiments, activity 545 can include delivering the item pursuant to the online order, as well.

In various embodiments, method 500 further can comprise an activity of assigning a first geographic area to the first fulfillment center and assigning a second geographic area to the second fulfillment center, where the first geographic area is different from the second geographic area. In some embodiments, a portion of the first geographic area can at least partially overlap a portion of the second geographic area. In various embodiments, the first fulfillment center and the second fulfillment center can deliver to the same address, the address residing in the both the first geographic area and the second geographic area (e.g., the address resides in a section of the first geographic area that overlaps a section of the second geographic area).

In some embodiments, method 500 further can comprise determining an updated first mean demand of the item at the first fulfillment center based at least in part on the second expected fill rate. In many embodiments, determining the updated first mean demand of the item at the first fulfillment center can be based at least in part on the formula in equation 3:

$$m_1^* = m_1 + (1 - EFR_2) * m_2 \quad \text{(Equation 3)};$$

where $m_1^*$ is the updated first mean demand of the item at the first fulfillment center, $m_1$ is an estimated first mean demand of the item at the first fulfillment center, and $m_2$ is an estimated second mean demand of the item at the second fulfillment center.

In many embodiments, method 500 further can comprise an activity of determining an updated second mean demand of the item at the second fulfillment center based at least in part on the first expected fill rate. In many embodiments, determining the updated first mean demand of the item at the first fulfillment can be based at least in part on the formula in equation 4:

$$m_2^* = m_2 + (1 - EFR_1) * m_1 \quad \text{(Equation 4)};$$

where $m_2^*$ is the updated second mean demand of the item at the second fulfillment center, $m_2$ is a estimated second mean demand of the item at the second fulfillment center, and $m_1$ is an estimated first mean demand of the item at the first fulfillment center.

In some embodiments, method 500 further can comprise an activity of determining an updated estimated first standard deviation of the item at the first fulfillment center based at least in part on the estimated first standard deviation, the estimated first mean demand, and the updated first mean demand. In some embodiments, determining the updated estimated first standard deviation can be based at least in part on the formula in equation 5:

$$s_1^* = s_1 * m_1^* / m_1; \quad \text{(Equation 5)};$$

Where $s_1^*$ is the updated estimated first standard deviation, and $s_i$ is an estimated first standard deviation for the first fulfillment center.

In some embodiments, method 500 further can comprise an activity of determining an updated estimated second standard deviation of the item at the second fulfillment center based at least in part on the estimated second standard deviation, the estimated second mean demand, and the updated second mean demand. In some embodiments, determining the updated estimated second standard deviation can be based at least in part on the formula in equation 6:

$$s_2^* = s_2 * m_2^* / m_2; \quad \text{(Equation 6)};$$

Wherein $s_2^*$ is the updated estimated second standard deviation, and is an estimated second standard deviation for the second fulfillment center.

In some embodiments, as an example of at least a portion of method 500, and assuming the following values:
$m_1 = 10$;
$s_1 = 5$;
$b_1 = 5$;
$m_2 = 15$;
$s_2 = 6$;
$b_2 = 4$;
$b_N = 12$;
$h = 1$;

a function f can be called at least once for the first fulfillment center and at least once for the second fulfillment center, using the received estimates for the local stockout costs ($b_i$), holding cost (h), mean demand ($m_i$), and standard deviation ($s_i$) (described above). The function can return an estimate of the expected fill rate (EFR) and the stocking plan for each fulfillment center:

$$\text{For } i \in \{1,2\}, EFR_i = f(b_i, h, m_i, s_i);$$

In some embodiments, the function $f(b_i, h, m_i, s_i)$ can comprise a standard periodic review inventory control algorithm. In many embodiments, the estimates of local stockout costs ($b_i$), mean demand ($m_i$), and standard deviation ($s_i$) can be updated as described above and as further described below. In many embodiments, the updated estimates can be indicated with an asterisk (*). In this embodiment, using equations 1-6 as described above and assuming $EFR_1=0.8$ and $EFR_2=0.9$, the estimates can be updated as follows:

$m_1^*=10+0.1*15=11.5$, (using Equation 3);

$m_2^*=15+0.2*10=17$, (using Equation 4);

$s_1^*=5*11.5/10=5.75$, (using Equation 5);

$s_2^*=6*17/15=6.8$ (using Equation 6);

$b_1^*=0.9*5+0.1*12=5.7$ (using Equation 1); and $b_2^*=0.8*4+0.2*12=5.6$ (using Equation 2).

In this example, the estimated mean demand and standard deviations of demand of the first fulfillment center have increased to reflect one or more demands that the second fulfillment center was unable to fill, and that, as a consequence, the first fulfillment center will have to try to satisfy in addition to the demands it is supposed to satisfy. The stockout costs also have changed to reflect that not all of the stockouts at a particular site (e.g., the first fulfillment center) will actually be filled by the other site (e.g., the second fulfillment center), but rather some demands can result in a network stockout instead.

In many embodiments, the stocking plans (e.g., the first stocking plan and/or the second stocking plan) can be updated based at least in part on the updated estimate of local stockout costs ($b_i$), mean demand ($m_i$), and/or standard deviation ($s_i$).

In some embodiments, when a network stockout cost and/or a local stockout cost has increased, a higher expected fill rate can be calculated, as inventory can be more valuable. In some embodiments, for example, assuming a first effective fill rate $EFR_1=0.88$ and a second effective fill rate $EFR_2=0.94$, the new stocking plan can be higher than the original stocking plan. In many embodiments, if the EFR for one or more of the fulfillment centers in the network have changed, then the values of the estimates of for the local stockout costs ($b_i$), mean demand ($m_i$), and standard deviation ($s_i$) can change as well. In this embodiment, using equations 1-6 as described above and the updated effective fill rates of $EFR_1=0.88$ and $EFR_2=0.94$, the estimates can be updated as follows:

$m_1^*=10+0.06*15=10.9$ (using Equation 3);

$m_2^*=15+0.12*10=16.2$ (using Equation 4);

$s_1^*=5*10.9/10=5.45$ (using Equation 5);

$s_2^*=6*16.2/15=6.48$ (using Equation 6)

$b_1^*=0.94*5+0.06*12=5.42$ (using Equation 1); and $b_2^*=0.88*4+0.12*12=4.96$ (using Equation 2).

In some embodiments, values of the estimates of for the local stockout costs ($b_i$), mean demand ($m_i$) can be continually updated until convergence. In some embodiments, method 500 further comprise continuing iterations of the calculations in at least one of equations 1-6 until at least one of the stocking plans (e.g., the first stocking plan and/or the second stocking plan) does not change and/or a number of iterations reaches a predetermined threshold. In some embodiments, the predetermined threshold can be approximately 3-10 iterations.

In some embodiments, method 500 further can comprise reevaluating the first stocking plan and/or second stocking plan when a shipment that comprises the item is due to the first fulfillment center and/or the second fulfillment center within the leadtime from the order form the user.

Returning to FIG. 4, FIG. 4 illustrates a block diagram of a portion of system 300 comprising inventory system 310, cost system 320, and/or delivery system 360, according to the embodiment shown in FIG. 3. Each of inventory system 310, cost system 320, and/or delivery system 360 is merely exemplary and is not limited to the embodiments presented herein. Each of inventory system 310, cost system 320, and/or delivery system 360 can be employed in many different embodiments or examples not specifically depicted or described herein. In some embodiments, certain elements or modules of inventory system 310, cost system 320, and/or delivery system 360 can perform various procedures, processes, and/or acts. In other embodiments, the procedures, processes, and/or acts can be performed by other suitable elements or modules.

In many embodiments, inventory system 310 can comprise non-transitory memory storage modules 412, cost system 320 can comprise non-transitory memory storage modules 422 and 424, and delivery system 360 can comprise a non-transitory memory storage module 462. Memory storage module 412 can be referred to as an allocation module 412. Memory storage module 422 can be referred to as a network module 422, and memory storage module 424 can be referred to as a local module 424. Memory storage module 462 can be referred to as a delivery module 462.

In many embodiments, allocation module 412 can store computing instructions configured to run on one or more processing modules and perform one or more acts of methods 500 (FIG. 5) (e.g., activity 505, activity 535, and/or activity 540).

In many embodiments, network module 422 can store computing instructions configured to run on one or more processing modules and perform one or more acts of methods 500 (FIG. 5) (e.g., activity 510).

In many embodiments, local module 424 can store computing instructions configured to run on one or more processing modules and perform one or more acts of methods 500 (FIG. 5) (e.g., activity 515, activity 520, activity 525, and/or activity 530).

In some embodiments, delivery module 462 can store computing instructions configured to run on one or more processing modules and perform one or more acts of methods 500 (FIG. 5) (e.g., activity 545).

Although systems and methods for inventory replenishment and allocation been described above, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the activities of FIG. 5 may include different activities and/or be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media configured to store computing instructions configured to run on the one or more processors and perform:
receiving an online order for an item from a user;
receiving an estimate of a network stockout cost of a network associated with the item, the network comprising at least a first fulfillment center and a second fulfillment center;
determining a first local stockout cost of the first fulfillment center for the item by allocating a first portion of the network stockout cost to the first fulfillment center;
determining a second local stockout cost of the second fulfillment center for the item by allocating a second portion of the network stockout cost to the second fulfillment center;
updating the first local stockout cost by a first formula:

$b_1^* = EFR_2 * b_1 + (1-EFR_2) * b_N;$ wherein:
$b_1^*$ is an updated first local stockout cost;
$EFR_2$ is a second expected fill rate of the second fulfillment center;
$b_1$ is the first local stockout cost; and
$b_N$ is the network stockout cost;
updating the second local stockout cost by a second formula:

$b_2^* = EFR_1 * b_2 + (1-EFR_1) * b_N;$ wherein:
$b_2^*$ is an updated second local stockout cost;
$EFR_1$ is a first expected fill rate of the first fulfillment center; and
$b_2$ is the second local stockout cost;
executing a first stocking plan for the item at the first fulfillment center based at least in part on the updated first local stockout cost, wherein the first stocking plan comprises a maximum number of units of the item to order for the first fulfillment center;
after delivery of a first shipment comprising the item to the first fulfillment center, sending instructions to re-order a first supply of the item for the first fulfillment center based on at least the first stocking plan;
executing a second stocking plan for the item at the second fulfillment center based at least in part on the updated second local stockout cost, wherein the second stocking plan comprises a maximum number of units of the item to order for the second fulfillment center;
after delivery of a second shipment comprising the item to the second fulfillment center, sending instructions to re-order a second supply of the item for the second fulfillment center based on at least the second stocking plan;
in response to receiving the online order for the item from the user, selecting the first fulfillment center to deliver the item pursuant to the online order from the user; and
after selecting the first fulfillment center to deliver the item, sending instructions for delivering the item from the first fulfillment center to the user based at least in part on the first stocking plan.

2. The system of claim 1, wherein:
the item comprises a holding cost, the holding cost comprising:
a first item holding cost associated with stocking the item at the first fulfillment center; and
a second item holding cost associated with stocking the item at the second fulfillment center.

3. The system of claim 2, wherein:
the first local stockout cost is based at least in part on the first item holding cost; and
the second local stockout cost is based at least in part on the second item holding cost.

4. The system of claim 1, wherein:
the computing instructions are further configured to run on the one or more processors and perform:
assigning a first geographic area to the first fulfillment center; and
assigning a second geographic area to the second fulfillment center, wherein the first geographic area is different from the second geographic area.

5. The system of claim 1, wherein:
the computing instructions are further configured to run on the one or more processors and perform:
determining an updated first mean demand of the item at the first fulfillment center based at least in part on the second expected fill rate.

6. The system of claim 5, wherein:
determining the updated first mean demand of the item at the first fulfillment center is further based at least in part on a formula:

$m_1^* = m_1 + (1-EFR_2) * m_2;$ wherein:
$m_1^*$ is the updated first mean demand;
$m_1$ is an estimated first mean demand; and
$m_2$ is an estimated second mean demand.

7. The system of claim 5, wherein:
the computing instructions are further configured to run on the one or more processors and perform:
determining an updated second mean demand of the item at the second fulfillment center based at least in part on the first expected fill rate.

8. The system of claim 7, wherein:
determining the updated second mean demand of the item at the second fulfillment center is further based at least in part on a formula:

$m_2^* = m_2 + (1-EFR_1) * m_1;$ wherein:
$m_2^*$ is the updated second mean demand;
$m_2$ is an estimated second mean demand; and
$m_1$ is an estimated first mean demand.

9. A method comprising:
receiving an online order for an item from a user;
receiving an estimate of a network stockout cost of a network associated with the item, the network comprising at least a first fulfillment center and a second fulfillment center;
determining a first local stockout cost of the first fulfillment center for the item by allocating a first portion of the network stockout cost to the first fulfillment center;
determining a second local stockout cost of the second fulfillment center for the item by allocating a second portion of the network stockout cost to the second fulfillment center;
updating the first local stockout cost by a first formula:

$$b_1^* = EFR_2 * b_1 + (1-EFR_2) * b_N;$$

wherein:
   $b_1^*$ is an updated first local stockout cost;
   $EFR_2$ is a second expected fill rate of the second fulfillment center;
   $b_1$ is the first local stockout cost; and
   $b_N$ is the network stockout cost;
updating the second local stockout cost by a second formula:

$$b_2^* = EFR_1 * b_2 + (1-EFR_1) * b_N;$$

wherein:
   $b_2^*$ is an updated second local stockout cost;
   $EFR_1$ is a first expected fill rate of the first fulfillment center; and
   $b_2$ is the second local stockout cost;
executing a first stocking plan for the item at the first fulfillment center based at least in part on the updated first local stockout cost, wherein the first stocking plan comprises a maximum number of units of the item to order for the first fulfillment center;
after delivery of a first shipment comprising the item to the first fulfillment center, sending instructions to re-order a first supply of the item for the first fulfillment center based on at least the first stocking plan;
executing a second stocking plan for the item at the second fulfillment center based at least in part on the updated second local stockout cost, wherein the second stocking plan comprises a maximum number of units of the item to order for the second fulfillment center;
after delivery of a second shipment comprising the item to the second fulfillment center, sending instructions to re-order a second supply of the item for the second fulfillment center based on at least the second stocking plan;
in response to receiving the online order for the item from the user, selecting the first fulfillment center to deliver the item pursuant to the online order from the user; and
after selecting the first fulfillment center to deliver the item, sending instructions for delivering the item from the first fulfillment center based at least in part on the first stocking plan.

10. The method of claim 9, wherein:
the item comprises a holding cost, the holding cost comprising:
   a first item holding cost associated with stocking the item at the first fulfillment center; and
   a second item holding cost associated with stocking the item at the second fulfillment center.

11. The method of claim 10, wherein:
the first local stockout cost is based at least in part on the first item holding cost; and
the second local stockout cost is based at least in part on the second item holding cost.

12. The method of claim 9, further comprising:
assigning a first geographic area to the first fulfillment center; and
assigning a second geographic area to the second fulfillment center, wherein the first geographic area is different from the second geographic area.

13. The method of claim 9, further comprising:
determining an updated first mean demand of the item at the first fulfillment center based at least in part on the second expected fill rate.

14. The method of claim 13, wherein:
determining the updated first mean demand of the item at the first fulfillment center is based at least in part on a formula:

$$m_1^* = m_1 + (1-EFR_2) * m_2;$$

wherein:
   $m_1^*$ is the updated first mean demand;
   $m_1$ is an estimated first mean demand; and
   $m_2$ is an estimated second mean demand.

15. The method of claim 13, further comprising:
determining an updated second mean demand of the item at the second fulfillment center based at least in part on the first expected fill rate.

16. The method of claim 15, wherein:
determining the updated first mean demand of the item at the first fulfillment center is further based at least in part on a formula:

$$m_2^* = m_2 + (1-EFR_1) * m_1;$$

wherein:
   $m_2^*$ is the updated second mean demand;
   $m_2$ is an estimated second mean demand; and
   $m_1$ is an estimated first mean demand.

17. A method comprising:
determining a network stockout cost of an item in a network, the network comprising at least a first fulfillment center and a second fulfillment center;
allocating a first portion of the network stockout cost of the item to the first fulfillment center of the network;
allocating a second portion of the network stockout cost of the item to the second fulfillment center of the network; and
updating the first portion of the network stockout cost by a first formula:

$$b_1^* = EFR_2 * b_1 + (1-EFR_2) * b_N;$$

wherein:
   $b_1^*$ is an updated first portion of the network stockout cost;
   $EFR_2$ is a second expected fill rate of the second fulfillment center;
   $b_1$ is the first portion of the network stockout cost; and
   $b_N$ is the network stockout cost;
updating the second portion of the network stockout cost by a second formula:

$$b_2^* = EFR_1 * b_2 + (1-EFR_1) * b_N;$$

wherein:
   $b_2^*$ is an updated second portion of the network stockout cost;
   $EFR_1$ is a first expected fill rate of the first fulfillment center; and
   $b_2$ is the second portion of the network stockout cost;

executing a first stocking plan for the item at the first fulfillment center based at least in part on the updated first portion of the network stockout cost, wherein the first stocking plan comprises a maximum number of units of the item to order for the first fulfillment center;

after delivery of a first shipment comprising the item to the first fulfillment center, sending instructions to re-order a first supply of the item for the first fulfillment center based on at least the first stocking plan;

executing a second stocking plan for the item at the second fulfillment center based at least in part on the updated second portion of the network stockout cost, wherein the second stocking plan comprises a maximum number of units of the item to order for the second fulfillment center;

after delivery of a second shipment comprising the item to the second fulfillment center, sending instructions to re-order a second supply of the item for the second fulfillment center based on at least the second stocking plan;

in response to receiving an online order for the item from a user, selecting the first fulfillment center to deliver the item pursuant to the online order from the user; and after selecting the first fulfillment center to deliver the item, sending instructions for delivering the item from the first fulfillment center based at least in part on the first stocking plan.

18. The method of claim 17, wherein:
the item comprises a holding cost, the holding cost comprising:
   a first item holding cost associated with stocking the item at the first fulfillment center; and
   a second item holding cost associated with stocking the item at the second fulfillment center.

19. The method of claim 18, wherein:
the first local stockout cost is based at least in part on the first item holding cost; and
the second local stockout cost is based at least in part on the second item holding cost.

20. The method of claim 17, further comprising:
assigning a first geographic area to the first fulfillment center; and
assigning a second geographic area to the second fulfillment center, wherein the first geographic area is different from the second geographic area.

* * * * *